(12) United States Patent
Lee et al.

(10) Patent No.: US 10,629,874 B2
(45) Date of Patent: Apr. 21, 2020

(54) CARTRIDGE FOR SECONDARY BATTERIES, AND BATTERY MODULE INCLUDING THE CARTRIDGE

(71) Applicant: LG CHEM, LTD., Seoul (KR)

(72) Inventors: Gang-U Lee, Daejeon (KR); Jun-Yeob Seong, Daejeon (KR); Sung-Chun Yu, Daejeon (KR); Yong-Joon Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 8 days.

(21) Appl. No.: 15/762,284

(22) PCT Filed: Sep. 28, 2016

(86) PCT No.: PCT/KR2016/010858
§ 371 (c)(1),
(2) Date: Mar. 22, 2018

(87) PCT Pub. No.: WO2018/008799
PCT Pub. Date: Jan. 11, 2018

(65) Prior Publication Data
US 2018/0301674 A1    Oct. 18, 2018

(30) Foreign Application Priority Data
Jul. 5, 2016    (KR) .......................... 10-2016-0084811

(51) Int. Cl.
*H01M 4/02*    (2006.01)
*H01M 2/10*    (2006.01)
(Continued)

(52) U.S. Cl.
CPC ....... *H01M 2/1077* (2013.01); *H01M 2/1005* (2013.01); *H01M 10/613* (2015.04);
(Continued)

(58) Field of Classification Search
CPC ...................................................... H01M 4/02
See application file for complete search history.

(56) References Cited

U.S. PATENT DOCUMENTS 9,755,285 B2    9/2017    Kim et al.
9,774,015 B2    9/2017    Moon et al.
(Continued)

FOREIGN PATENT DOCUMENTS

JP    10-294393 A    11/1998
KR    10-2014-0015257 A    2/2014
(Continued)

OTHER PUBLICATIONS

English Translation of Written Opinion of the International Searching Authority for Appl. No. PCT/KR2016/010858 dated Apr. 3, 2017.
(Continued)

*Primary Examiner* — Jacob B Marks
(74) *Attorney, Agent, or Firm* — Birch, Stewart, Kolasch & Birch, LLP

(57) ABSTRACT

A cartridge for secondary batteries, according to the present disclosure, includes a main frame including at least four unit frames connected to each other at ends thereof to provide a cavity inside the four unit frames, wherein at least some of the unit frames have openings penetrating therethrough in a horizontal direction and two or more main frames are configured to be vertically stackable on one another, an upper cooling plate having a plate shape, including an upper bonding portion serving as edges and boned to the main frame, and arranged to cover the cavity, and a lower cooling plate having a plate shape, including a lower bonding portion serving as edges and boned to the main frame, and spaced apart from the upper cooling plate by a predetermined distance to face the upper cooling plate and gener- (Continued)

ating a cooling channel between the upper and lower cooling plates.

16 Claims, 14 Drawing Sheets

(51) Int. Cl.
*H01M 10/6557* (2014.01)
*H01M 10/643* (2014.01)
*H01M 10/613* (2014.01)
*H01M 10/625* (2014.01)
*H01M 10/6556* (2014.01)
*B60L 50/60* (2019.01)
*B60K 6/28* (2007.10)

(52) U.S. Cl.
CPC ....... *H01M 10/625* (2015.04); *H01M 10/643* (2015.04); *H01M 10/6556* (2015.04); *H01M 10/6557* (2015.04); *B60K 6/28* (2013.01); *B60L 50/66* (2019.02); *B60Y 2200/91* (2013.01); *B60Y 2200/92* (2013.01); *B60Y 2400/112* (2013.01); *H01M 2220/20* (2013.01)

(56) References Cited

U.S. PATENT DOCUMENTS

| | | |
|---|---|---|
| 2011/0293982 A1 | 12/2011 | Martz et al. |
| 2013/0266838 A1 | 10/2013 | Von Borck et al. |
| 2015/0064535 A1* | 3/2015 | Seong ............... H01M 10/6563 |
| | | 429/120 |
| 2016/0254504 A1 | 9/2016 | Kim et al. |

FOREIGN PATENT DOCUMENTS

| | | |
|---|---|---|
| KR | 10-2014-0144787 A | 12/2014 |
| KR | 10-2015-0025241 A | 3/2015 |
| KR | 10-2015-0025308 A | 3/2015 |
| KR | 10-2015-0050358 A | 5/2015 |
| KR | 10-2015-0050449 A | 5/2015 |
| KR | 10-2016-0049888 A | 5/2016 |

OTHER PUBLICATIONS

International Search Report for PCT/KR2016/010858 (PCT/ISA/210) dated Apr. 3, 2017.

* cited by examiner

CARTRIDGE FOR SECONDARY BATTERIES, AND BATTERY MODULE INCLUDING THE CARTRIDGE

TECHNICAL FIELD

The present application claims priority to Korean Patent Application No. 10-2016-0084811 filed on Jul. 5, 2016 in the Republic of Korea, the disclosure of which is incorporated herein by reference.

The present disclosure relates to a battery and, more particularly, to cartridges used to accommodate or stack a plurality of secondary batteries when configuring a battery module by including the secondary batteries, and a battery module including the cartridges.

BACKGROUND ART

Currently commercialized secondary batteries include nickel cadmium batteries, nickel hydrogen batteries, nickel zinc batteries, lithium secondary batteries, etc. Compared to the nickel-based secondary batteries, the lithium secondary batteries rarely have the memory effect and thus are freely rechargeable or dischargeable, have a very low self-discharge rate, and have a high energy density.

The lithium secondary batteries generally use lithium-based oxide and a carbon material as a positive electrode active material and a negative electrode active material, respectively. The lithium secondary battery includes an electrode assembly in which a positive plate and a negative plate coated with the positive electrode active material and the negative electrode active material are provided by disposing a separator therebetween, and a housing, i.e., a battery case, for sealing and accommodating the electrode assembly together with an electrolyte.

In general, depending on the shape of the housing, the lithium secondary battery may be divided into a can-type secondary battery in which the electrode assembly is accommodated in a metal can, and a pouch-type secondary battery in which the electrode assembly is accommodated in a pouch made of an aluminum laminate sheet.

Secondary batteries are broadly used not only in small devices such as portable electronic devices but also in medium or large devices such as vehicles or power storage devices. When used in the medium or large devices, a large number of secondary batteries are electrically connected to increase capacity and output. Particularly, pouch-type secondary batteries are easily stackable on one another and thus are commonly used in the medium or large devices.

However, the pouch-type secondary battery is generally wrapped by a battery case made of a laminate sheet of aluminum and polymer resin and thus has a low mechanical strength. Accordingly, when a battery module including a plurality of pouch-type secondary batteries is configured, cartridges are used in many cases to protect the secondary batteries from external impact, to prevent motion of the secondary batteries, and to easily stack the secondary batteries on one another. The term "cartridge" is interchangeable with various other terms such as "frame". A plurality of cartridges are stacked on one another to configure a battery module, and secondary batteries may be located in empty spaces generated when the cartridges are stacked on one another.

When a plurality of secondary batteries are assembled using a plurality of cartridges as described above, plate-shaped cooling fins, i.e., cooling plates, may be provided between the secondary batteries. The secondary batteries may be used in a hot environment, e.g., summer, and may autonomously generate heat. In this case, if a plurality of secondary batteries are stacked on one another, the temperature of the secondary batteries may be further increased. If the temperature is increased beyond a proper temperature, the performance of the secondary batteries may deteriorate and, even worse, the secondary batteries may explode or burn. Therefore, when a battery module is configured, cooling plates may be provided between the secondary batteries to prevent an increase in temperature of the secondary batteries.

The battery module in which the cooling plates are provided between the secondary batteries may cool the secondary batteries in various manners. As a representative cooling method, an air cooling method for reducing the temperature of the secondary batteries by making the external air flow near the cooling plates to exchange heat between the cooling plates and the air. In the battery module for cooling the secondary batteries using the air cooling method, the air may flow into and out of the battery module by providing cooling channels near the cooling plates and connecting the cooling channels to ducts.

In general, a cooling plate may be made of metal such as aluminum and a part other than the cooling plate, e.g., a frame, may be made of a material such as plastic. The above-described cartridge for secondary batteries may be manufactured using various methods. Representatively, insert injection molding may be used. Based on insert injection molding, the cartridge may be manufactured by preparing a cooling plate and then injection-molding a frame body while the cooling plate is in an insert injection molding machine.

However, using the above-described manufacturing method, the cooling plate may be deformed due to contraction of the frame body. That is, when a cooling process from a high temperature to a low temperature is performed during insert injection molding, the injection-molded frame body may contract more than the cooling plate. For example, in the cooling process, a frame body 1 may contract as shown by arrows in FIG. 1.

A cooling plate 2 is generally configured as a thin plate. If the frame body 1 contracts as described above, the cooling plate 2 may not resist the contraction of the frame body 1 but may be deformed or distorted. Due to the deformation or distortion, a cooling channel may not be stably ensured and thus a cooling effect may be greatly reduced.

Furthermore, a pouch-type secondary battery may generate a harmful gas during operation. In this case, the harmful gas may leak through a gap between the cooling plate 2 and the frame body 1 and flow into the cooling channel. For example, in an electric vehicle, air in a cooling channel of a battery pack may flow out of the battery pack into an air circulation duct of the vehicle and the air of the air circulation duct may flow into the vehicle. As such, if the harmful gas flows into the cooling channel, the harmful gas may flow into the vehicle and damage health of people in the vehicle. However, the cartridge according to the related art insert injection molding method may not solve the above problem due to unstable sealability between the frame body 1 and the cooling plate 2.

DISCLOSURE

Technical Problem

The present disclosure is designed to solve the problems of the related art, and therefore the present disclosure is directed to providing a cartridge for secondary batteries, the cartridge capable of increasing a coupling force and a sealing force between cooling plates and a main frame made of different materials, and of preventing a gas generated by the secondary batteries, from flowing into a cooling channel or a duct connected thereto, and a battery module including the cartridge.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a cartridge for secondary batteries, the cartridge including a main frame including at least four unit frames connected to each other at ends thereof to provide a cavity inside the four unit frames, wherein at least some of the unit frames have openings penetrating therethrough in a horizontal direction and two or more main frames are configured to be vertically stackable on one another, an upper cooling plate having a plate shape, including an upper bonding portion serving as edges and boned to the main frame, and arranged to cover the cavity, and a lower cooling plate having a plate shape, including a lower bonding portion serving as edges and boned to the main frame, and spaced apart from the upper cooling plate by a predetermined distance to face the upper cooling plate and generating a cooling channel between the upper and lower cooling plates.

The main frame may include an upper groove provided along a circumferential direction, having a concave shape, and filled with an adhesive, and a lower groove provided below the upper groove, having a shape symmetrical to the upper groove, and filled with the adhesive, and the upper bonding portion may be bonded and fixed to the upper groove and the lower bonding portion may be boned and fixed to the lower groove.

An end of the upper bonding portion may be bent downward and may be inserted into the upper groove, and an end of the lower bonding portion may be bent upward and may be inserted into the lower groove.

The main frame may include an outer portion serving as outer edges of the main frame, and an inner portion extending from between top and bottom surfaces of the outer portion in the horizontal direction to provide the upper and lower grooves, and including an end bent upward and downward.

The upper bonding portion may have a convex shape in an upward direction and cover the inner portion from above to surround the adhesive, and the lower bonding portion may have a convex shape in a downward direction and cover the inner portion from below to surround the adhesive.

Inner circumferential surfaces of the upper and lower bonding portions may surround the adhesive and may be embossed.

An end of the upper bonding portion may face downward and an end of the lower bonding portion may face upward, and the inner portion may include end seat gutters into which the ends of the upper and lower bonding portions are tightly fittable.

The upper bonding portion may include an upper reinforcing rib protruding downward from a location spaced apart from the end of the upper bonding portion by a predetermined distance, the lower bonding portion may include a lower reinforcing rib protruding upward from a location spaced apart from the end of the lower bonding portion by a predetermined distance, and the inner portion may further include reinforcing rib seat gutters into which the upper and lower reinforcing ribs are tightly fittable.

The main frame may include a sealing rib protruding from a top or bottom surface of at least one unit frame in a vertical direction, and a trench having a larger size than the sealing rib and provided in a surface opposite to the surface on which the sealing rib is provided, and the main frame may further include a sealing member coupled to the sealing rib and at least partially inserted into the trench of a neighboring main frame when the main frames are vertically stacked on one another.

The main frame may include four unit frames to configure a rectangular structure, the openings may be provided in a pair of unit frames corresponding to long sides of the main frame, and the main frame may further include a plate supporting member having an end fixed to the opening of any one of the pair of unit frames and another end fixed to the opening of the other of the pair of unit frames, and configured to cross the cavity of the main frame in the horizontal direction.

The main frame may further include an inner protrusion located on the inner portion between the upper groove and the bent end or between the lower groove and the bent end, and protruding upward and downward.

The main frame may further include an upper outer gutter provided in the outer portion near the upper groove and located outside the upper cooling plate, and a lower outer gutter provided in the outer portion near the lower groove and located outside the lower cooling plate, and the adhesive may be inserted into the upper and lower outer gutters.

In another aspect of the present disclosure, there is also provided a battery module including the above-described cartridge for secondary batteries.

In another aspect of the present disclosure, there is also provided a battery pack including the at least one battery module.

In another aspect of the present disclosure, there is also provided a vehicle including the battery pack. The vehicle may include an electric vehicle, a hybrid electric vehicle, or a plug-in hybrid electric vehicle Advantageous Effects According to an aspect of the present disclosure, compared to a related art cartridge, a coupling force and sealability between cooling plates and a main frame may be greatly increased.

Particularly, according to an aspect of the present disclosure, even when a gas is generated by secondary batteries while a battery module or a battery pack is in use, the gas may be prevented from flowing into a channel between the cooling plates.

According to another aspect of the present disclosure, since the cooling plates are rarely distorted or deformed, a cooling channel may be stably ensured and thus cooling efficiency may be increased.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
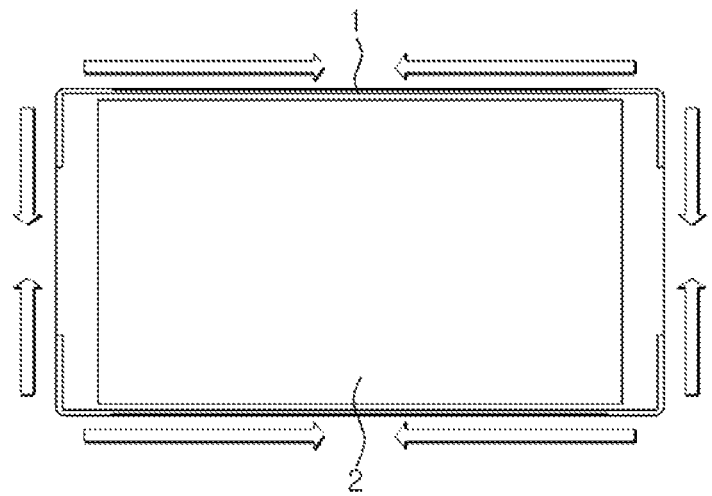
FIG. 1 is a top view of a cartridge for secondary batteries, according to the related art.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In the following description of the present disclosure, a detailed description of known functions and configurations incorporated herein will be omitted when it may make the subject matter of the present disclosure unclear.

Since embodiments of the present disclosure are provided to fully convey the concept of the disclosure to one of ordinary skill in the art, the shapes and sizes of elements in the drawings can be exaggerated, omitted, or simplified for clarity. Thus, the size or ratio of each element does not exactly reflect the actual size or ratio thereof.

A cartridge for secondary batteries, according to the present disclosure, is used to configure a battery module by stacking and packaging a plurality of secondary batteries, and may hold the secondary batteries to prevent motion thereof and guide assembly of the secondary batteries.

Figure 2:
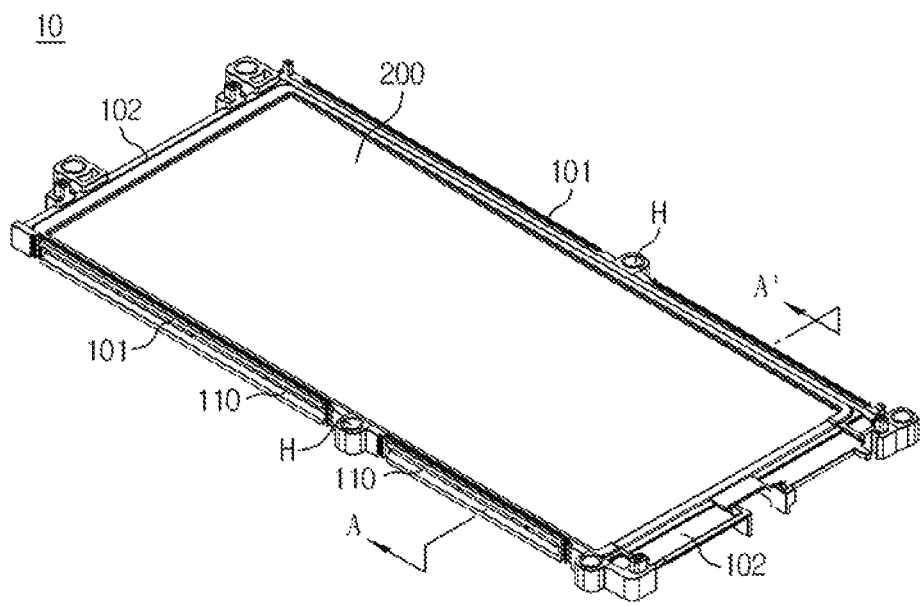
FIG. 2 is a perspective view of a cartridge for secondary batteries, according to an embodiment of the present disclosure.
Figure 3:
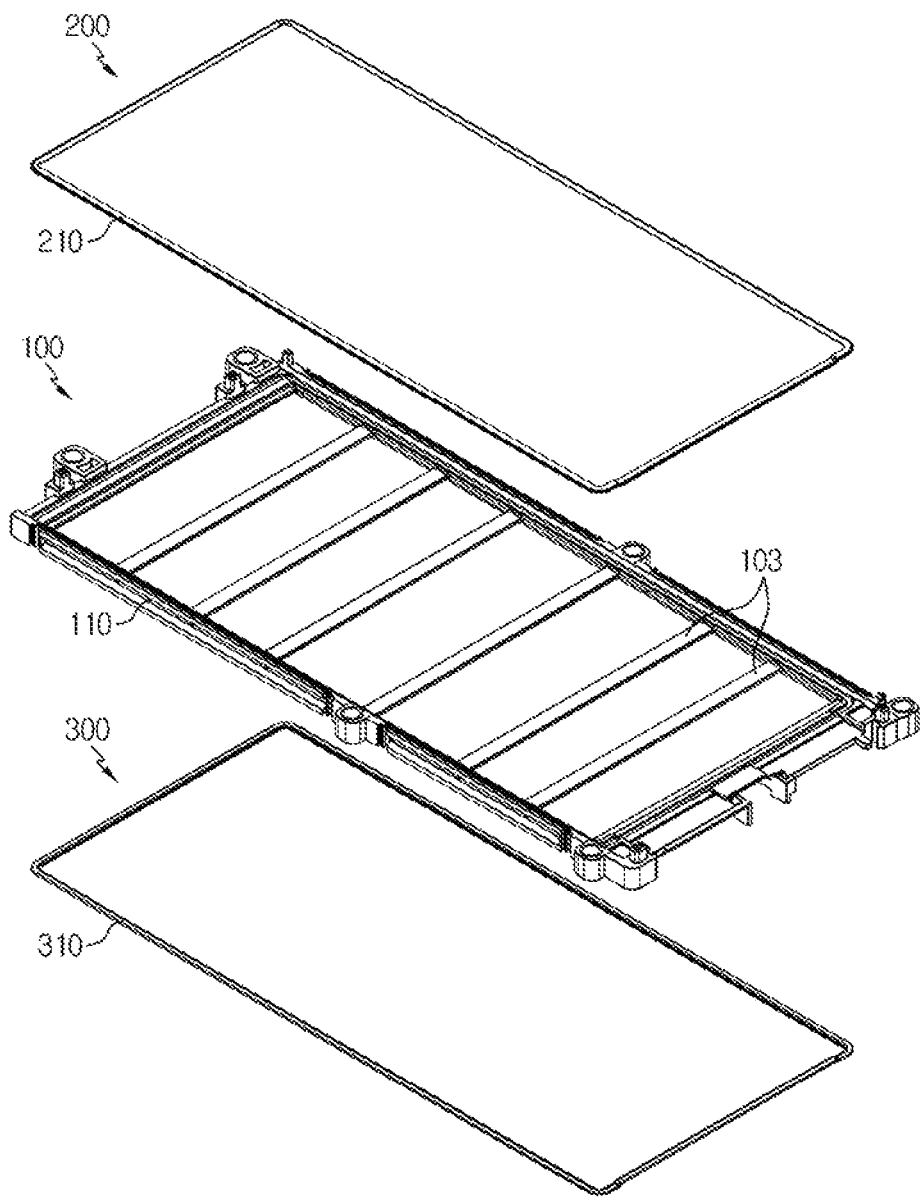
FIG. 3 is an exploded perspective view of FIG. 2.
Figure 4:
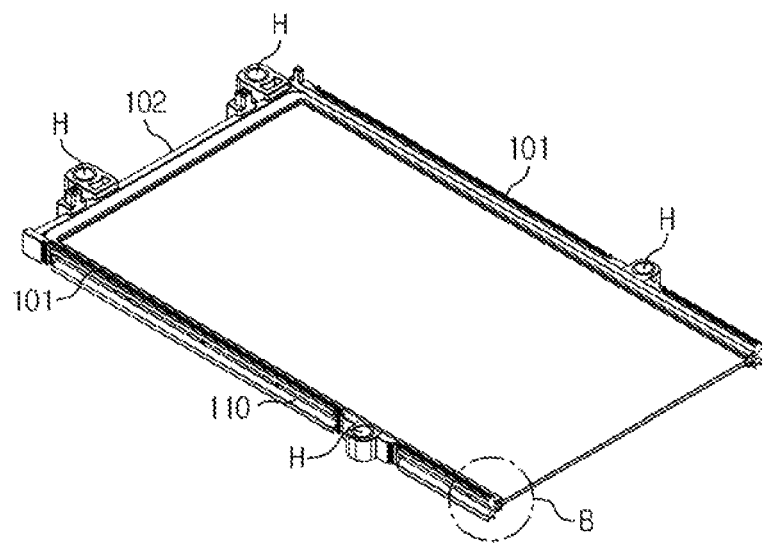
FIG. 4 is a perspective view of the cartridge cut along line A-A' of FIG. 2.
Figure 5:
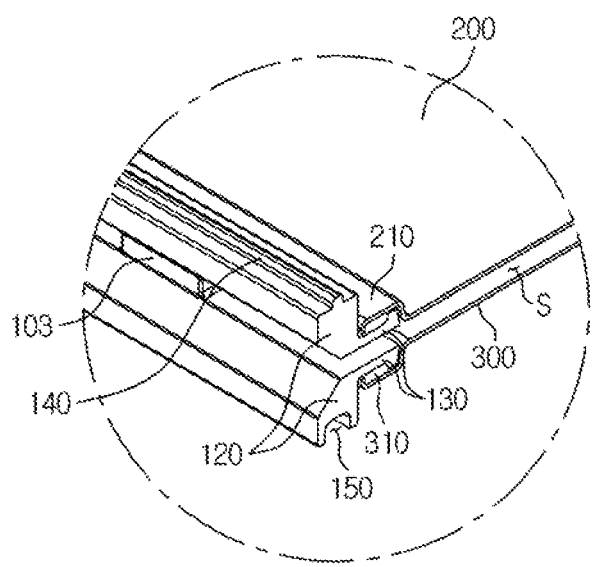
FIG. 5 is a magnified view of portion B of FIG. 4.
Figure 6:
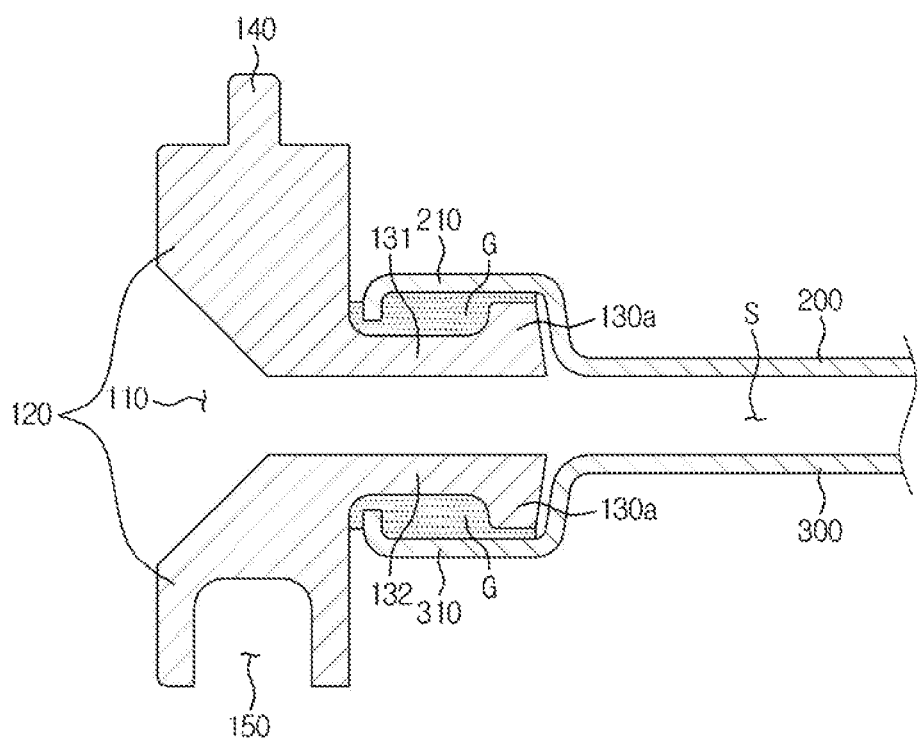
FIG. 6 is a cross-sectional view of FIG. 5.

FIG. 2 is a perspective view of a cartridge 10 for secondary batteries, according to an embodiment of the present disclosure, FIG. 3 is an exploded perspective view of FIG. 2, FIG. 4 is a perspective view of the cartridge 10 cut along line A-A' of FIG. 2, FIG. 5 is a magnified view of portion B of FIG. 4, and FIG. 6 is a cross-sectional view of FIG. 5.

Initially, referring to FIGS. 2 and 3, the cartridge 10 according to the present disclosure includes a main frame 100, an upper cooling plate 200, and a lower cooling plate 300.

The main frame 100 is an element serving as edges, and may be made of polymer. Particularly, the main frame 100 may include four unit frames 101 and 102. The unit frames 101 and 102 are connected to each other at ends thereof to provide a cavity inside. That is, when the cartridge 10 is viewed from above, the cartridge 10 may have an almost rectangular ring shape. In the current embodiment, the main frame 100 may have a rectangular shape and may include a pair of unit frames 101 corresponding to long sides and a pair of unit frames 102 corresponding to short sides.

Herein, the four unit frames 101 and 102 may be integrally produced or may be separately produced and then assembled to each other to manufacture the cartridge 10.

As illustrated in FIGS. 2 and 3, openings 110 penetrating at least some unit frames, e.g., the pair of unit frames 101 corresponding to the long sides, in a horizontal direction may be provided in the main frame 100. Accordingly, a cooling fluid such as air may flow through the openings 110 in left and right directions of the unit frames.

The upper cooling plate 200 may have a plate shape and may be laid in such a manner that wide surfaces thereof face upward and downward. Particularly, the upper cooling plate 200 may have a rectangular plate shape. The main frame 100 may be located at edges of the upper cooling plate 200.

Like the upper cooling plate 200, the lower cooling plate 300 may have a plate shape and may be laid in such a manner that wide surfaces thereof face upward and downward. The lower cooling plate 300 may have a rectangular plate shape, and the main frame 100 may be located at edges of the lower cooling plate 300. The lower cooling plate 300 may be spaced apart from the upper cooling plate 200 by a predetermined distance to generate a cooling channel S between the upper and lower cooling plates 200 and 300.

Specifically, as illustrated in FIGS. 4 to 6, the edges of the upper and lower cooling plates 200 and 300 are bonded to an inner portion 130 of the main frame 100 from above and below and thus the upper and lower cooling plates 200 and 300 are spaced apart from each other by the predetermined distance in a vertical direction. The wide surfaces inside the edges of the upper and lower cooling plates 200 and 300 cover the cavity of the main frame 100 from above and below and thus the cooling channel S is generated in a space between the upper and lower cooling plates 200 and 300. The openings 110 provided in two unit frames facing each other, e.g., the pair of unit frames 101 corresponding to the long sides in the current embodiment, may correspond to an entrance and an exit of the cooling channel S. Due to the above-described configuration, the cooling fluid may flow into the cooling channel S through an opening 110 of the main frame 100, and flow out of the cooling channel S through the other opening 110.

As described above, since the cooling channel S is generated in the space between the upper and lower cooling plates 200 and 300, the upper and lower cooling plates 200 and 300 may exchange heat with secondary batteries located thereon and thereunder. Particularly, the upper and lower cooling plates 200 and 300 may be made of aluminum having a high thermal conductivity, excellent moldability, and a light weight. However, the present disclosure is not limited to the above cooling plate material and the cooling plates may also be made of a variety of materials, e.g., metals other than aluminum.

As illustrated in FIG. 3, the main frame 100 according to the current embodiment may further include a plurality of plate supporting members 103 provided in the space between the upper and lower cooling plates 200 and 300, i.e., in the cooling channel S.

The plate supporting members 103 may have a bar shape. An end of each plate supporting member 103 may be fixed to the opening 110 of any one unit frame, and the other end thereof may be fixed to the opening 110 of an opposite unit frame.

The plate supporting members 103 support the upper and lower cooling plates 200 and 300 in such a manner that the distance between the upper and lower cooling plates 200 and 300 is constantly maintained. That is, the plate supporting members 103 suppress distortion or deformation of the cooling plates to stably ensure the cooling channel S.

The cartridge 10 according to the present disclosure is not manufactured using insert injection molding. That is, the cartridge 10 according to the present disclosure may be manufactured by individually producing the cooling plates and the main frame 100 and then bonding the same using an adhesive G.

A coupling structure between the cooling plates and the main frame 100 will now be described in detail.

Referring to FIGS. 4 to 6, the main frame 100 according to the present disclosure includes an outer portion 120 serving as outer edges of the main frame 100, and the inner portion 130 extending from the outer portion 120 toward the inside of the main frame 100 to serve as inner edges of the main frame 100.

The outer portion 120 corresponds to outermost edges of the cartridge 10, and covers outer circumferences of secondary batteries to protect the secondary batteries from being exposed. That is, the secondary batteries may be located inside the outer portion 120, and the outer portion 120 may have a thickness greater than that of at least one secondary battery. The outer portion 120 may include a plurality of coupling holes H penetrating the same in the vertical direction. When a plurality of cartridges 10 are vertically stacked on one another, the cartridges 10 may be coupled to each other by inserting a coupling member (not shown) into the coupling holes H.

In the current embodiment, the unit frames 101 corresponding to the long sides and the unit frames 102 corresponding to the short sides may have different shapes of the outer portion 120. The unit frames 102 corresponding to the short sides from which electrode leads of the secondary batteries are exposed may have a smaller thickness and a larger width compared to those of the other unit frames 101. On the contrary, as described above, the outer portion 120 of the unit frames 101 corresponding to the long sides may be configured in such a manner that the openings 110 penetrate the unit frames 101 in the horizontal direction.

The inner portion 130 may include grooves 131 and 132. Referring to FIG. 6, the inner portion 130 extends from the outer portion 120 by a predetermined length in the horizontal direction and has a bent end 130a. As such, the grooves 131 and 132 having a valley shape may be provided between the bent end 130a and surfaces of the inner portion 130 perpendicular to the outer portion 120.

In other words, the inner portion 130 may extend from between top and bottom surfaces of the outer portion 120 toward the inside of the main frame 100 by the predetermined length in the horizontal direction. The end 130a of the inner portion 130 may be bent upward and downward. As such, an upper groove 131 having a concave shape, and a lower groove 132 provided below the upper groove 131 and having a shape symmetrical to the upper groove 131 may be provided in the main frame 100. The upper and lower grooves 131 and 132 may be continuously provided along a circumferential direction of the main frame 100.

The grooves 131 and 132 have a width corresponding to a distance by which the inner portion 130 extends from the outer portion 120 in the horizontal direction, and a depth corresponding to a height by which the end 130a of the inner portion 130 is bent. The adhesive G may be coated in the upper and lower grooves 131 and 132. Herein, since the adhesive G may not be sufficiently coated if the grooves 131 and 132 have an excessively small width or height, preferably, the grooves 131 and 132 are configured to have proper width and depth. For example, the grooves 131 and 132 may be configured to have a width corresponding to a case when side wings of a secondary battery are folded, and a height corresponding to about a half of the thickness of the secondary battery.

The upper and lower cooling plates 200 and 300 according to the present disclosure include an upper bonding portion 210 and a lower bonding portion 310 bonded and fixed to the upper and lower grooves 131 and 132, respectively. Herein, the upper bonding portion 210 serves as the edges of the upper cooling plate 200, and the lower bonding portion 310 serves as the edges of the lower cooling plate 300.

Referring to FIGS. 5 and 6, the upper bonding portion 210 may have a convex shape in an upward direction with respect to the wide surface inside the edges of the upper cooling plate 200, and the lower bonding portion 310 may have a convex shape in a downward direction with respect to the wide surface inside the edges of the lower cooling plate 300. An end of the upper bonding portion 210 may be bent downward, and an end of the lower bonding portion 310 may be bent upward.

Due to the above-described configuration, when the upper cooling plate 200 is mounted on the main frame 100, the end of the upper bonding portion 210 may be located near the outer portion 120 and thus the upper bonding portion 210 may surround the inner portion 130 of the main frame 100 downward. Likewise, the lower bonding portion 310 may surround the inner portion 130 of the main frame 100 upward. Herein, inner circumferential surfaces of the upper and lower bonding portions 210 and 310 may be bonded to the adhesive G filled in the upper and lower grooves 131 and 132.

As described above, since the upper and lower bonding portions 210 and 310 of the cooling plates surround the inner portion 130 of the main frame 100 downward and upward and the adhesive G is filled in a space between the upper bonding portion 210 and the upper groove 131 and a space between the lower bonding portion 310 and the lower groove 132, gaps may rarely occur at coupling parts between the cooling plates 200 and 300 and the main frame 100. In addition, compared to direct surface-to-surface bonding, a coupling force and sealability may be further increased. Particularly, when a gas is generated by the secondary batteries, the above-described bonding structure may prevent leakage of the gas through the coupling parts between the cooling plates and the main frame 100.

FIGS. 7 to 13 are cross-sectional views of a part of the cartridge 10 for secondary batteries, according to other embodiments of the present disclosure. The descriptions provided above are not repeated herein and the following descriptions will be focused on the differences therefrom.

Figure 7:
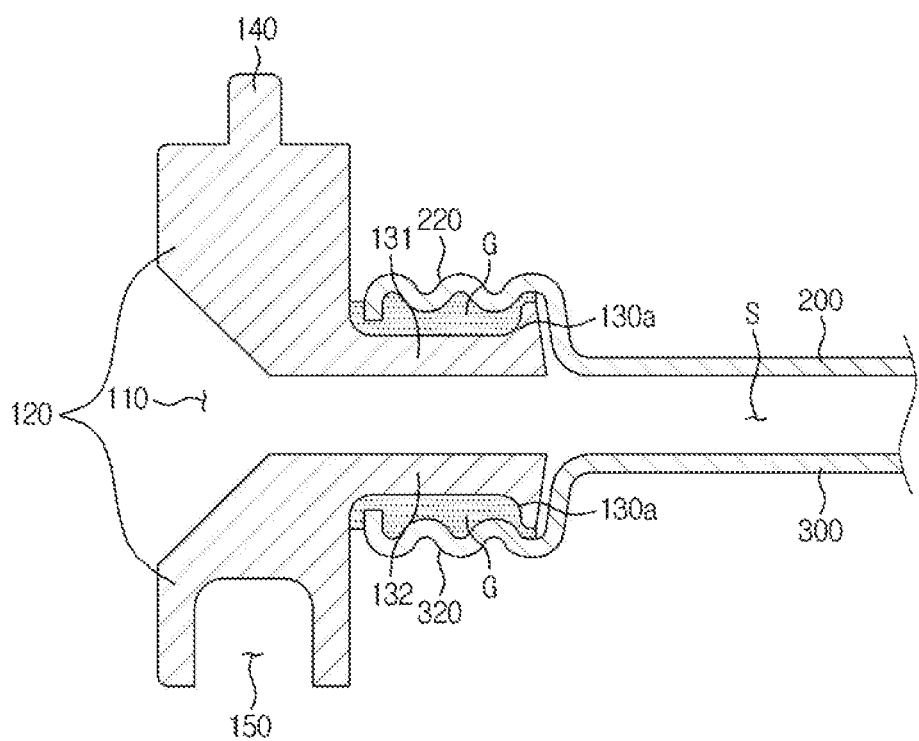
FIGS. 7 to 13 are cross-sectional views of a part of a cartridge for secondary batteries, according to other embodiments of the present disclosure.

As illustrated in FIG. 7, an upper bonding portion 220 and a lower bonding portion 320 according to another embodiment of the present disclosure, which surround the inner portion 130 of the main frame 100, may be at least partially embossed.

That is, the upper and lower bonding portions 220 and 320 may be embossed and thus inner circumferential surfaces thereof may be uneven. Compared to flat surfaces, the uneven surfaces may have larger unit areas bondable to the adhesive G and thus a coupling force may be increased.

For reference, the current embodiment shows a part of the embossed upper and lower bonding portions 220 and 320 but the scope of the present disclosure is not limited thereto. For example, the upper and lower bonding portions 220 and 320 may be configured to include a plurality of protrusion on the inner circumferential surfaces surrounding the adhesive G.

Figure 8:
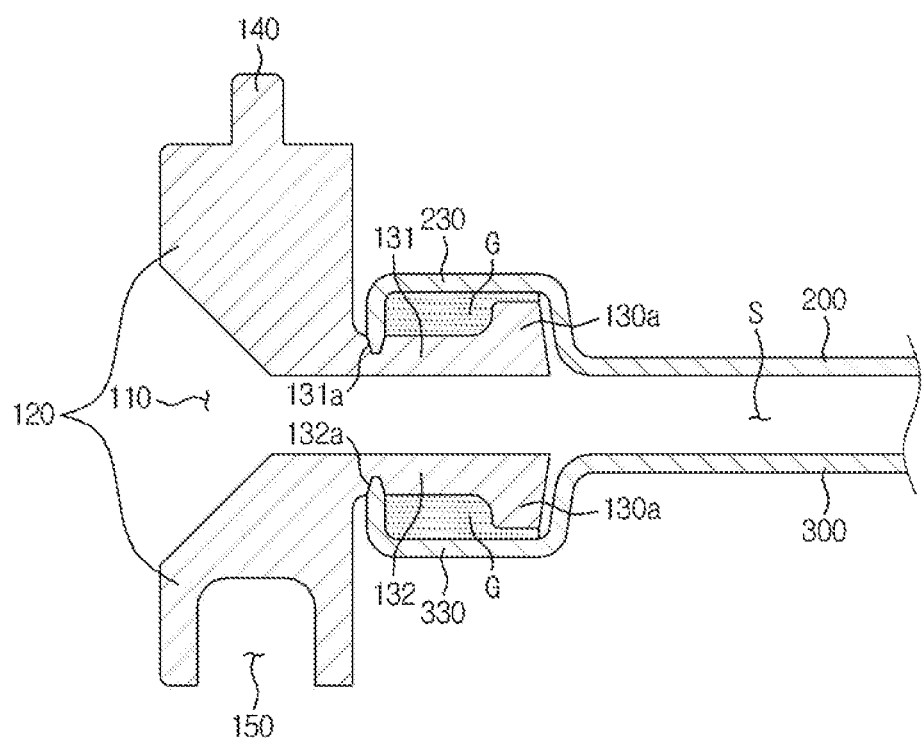

As illustrated in FIG. 8, according to another embodiment of the present disclosure, the inner portion 130 of the main frame 100 may further include end seat gutters 131a and 132a into which ends of an upper bonding portion 230 and a lower bonding portion 330 are tightly fitted.

The end seat gutters 131a and 132a may be configured as gutters dented from the surfaces of the inner portion 130 by a predetermined depth, and the width of the gutters may be gradually reduced as the depth thereof is increased. Preferably, the end seat gutters 131a and 132a are provided directly near the outer portion 120. Ends of the upper and lower bonding portions 230 and 330 may be tapered to correspond to the shape of the end seat gutters 131a and 132a.

For reference, the shape of the ends of the upper and lower bonding portions 230 and 330 of the current embodiment may differ from that of the end seat gutters 131a and 132a of the inner portion 130 as long as the ends of the upper and lower bonding portions 230 and 330 are insertable into the inner portion 130.

Due to the above-described configuration, if the ends of the upper and lower bonding portions 230 and 330 are tightly fitted into the end seat gutters 131a and 132a provided in the inner portion 130 of the main frame 100, the upper and lower cooling plates 200 and 300 may be fixed to the inner portion 130 without being detached. Since inner circumferential surfaces of the upper and lower bonding portions 230 and 330 press the adhesive G filled in the grooves 131 and 132, bonding force may be further increased. Furthermore, since the ends of the upper and lower bonding portions 230 and 330 are partially inserted into the main frame 100, a sealing force or sealability may be further increased.

Figure 9:
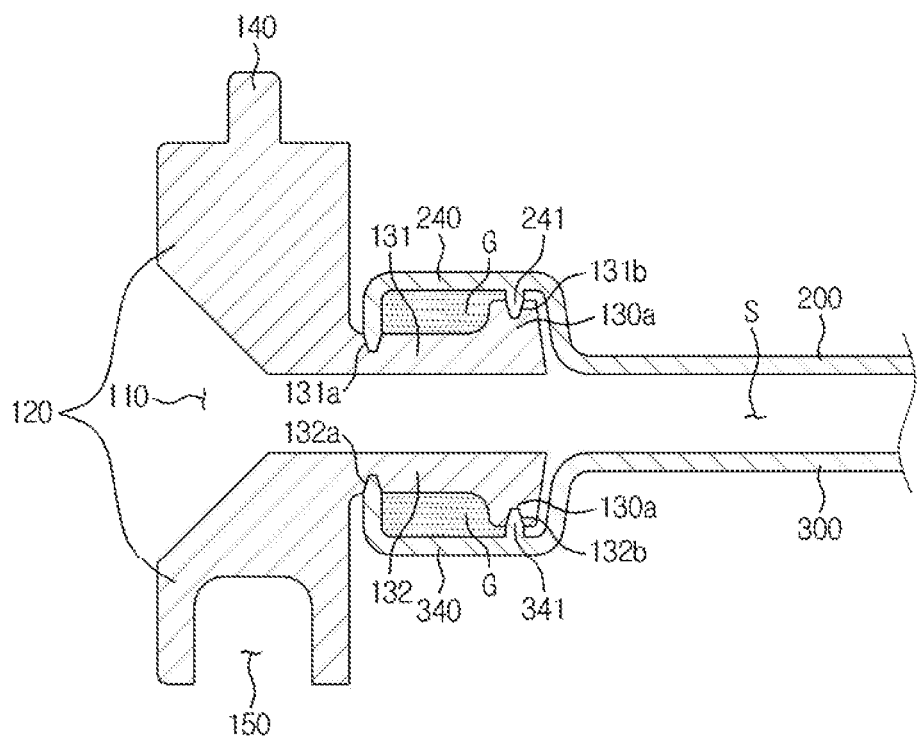

As illustrated in FIG. 9, according to another embodiment of the present disclosure, an upper bonding portion 240 may further include an upper reinforcing rib 241 protruding downward from a location spaced apart from an end of the upper bonding portion 240 by a predetermined distance. Likewise, a lower bonding portion 340 may further include lower reinforcing rib 341 protruding upward from a location spaced apart from an end of the lower bonding portion 340 by a predetermined distance. The inner portion 130 of the main frame 100 may further include reinforcing rib seat gutters 131b and 132b into which the upper and lower reinforcing ribs 241 and 341 are tightly fitted.

Like the above-described end seat gutters 131a and 132a, the reinforcing rib seat gutters 131b and 132b may be configured as gutters dented from the surfaces of the inner portion 130 by a predetermined depth, and the width of the gutters may be gradually reduced as the depth thereof is increased. Preferably, the reinforcing rib seat gutters 131b and 132b are provided in the end 130a bent upward and downward from the inner portion 130. In this case, the upper and lower reinforcing ribs 241 and 341 may be provided on the upper and lower bonding portions 240 and 340 to correspond to the locations of the reinforcing rib seat gutters 131b and 132b.

Due to the above-described configuration, the end of the upper bonding portion 240 and the upper reinforcing rib 241 may be tightly fitted into a top surface of the inner portion 130, and the end of the lower bonding portion 340 and the lower reinforcing rib 341 may be tightly fitted into a bottom surface of the inner portion 130. Accordingly, the upper and lower cooling plates 200 and 300 may be more firmly fixed and coupled to the main frame 100. If the adhesive G is solidified while the cooling plates 200 and 300 and the main frame 100 are stably fixed to each other, a coupling force may be further increased compared to the above-described embodiment.

Furthermore, since at least parts of the end of the upper bonding portion 240 and the upper reinforcing rib 241 are inserted into the inner portion 130 and at least parts of the end of the lower bonding portion 310 and the lower reinforcing rib 341 are inserted into the inner portion 130 in a symmetrical manner between the upper and lower bonding portions 210 and 310, a sealing force at the coupling parts between the cooling plates 200 and 300 and the main frame 100 may be further increased.

Figure 10:
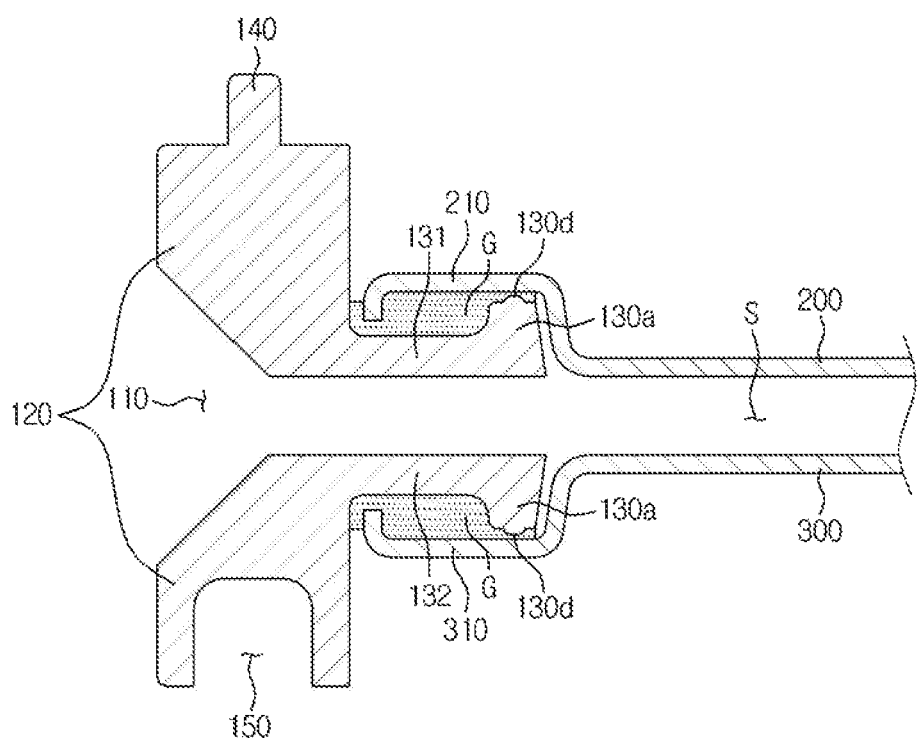

As illustrated in FIG. 10, according to another embodiment of the present disclosure, the main frame 100 may further include inner protrusions 130d. The inner protrusions 130d may be located on the inner portion 130 between the upper groove 131 and the bent end 130a or between the lower groove 132 and the bent end 130a. The inner protrusions 130d may protrude upward and downward. For example, the inner protrusion 130d located between the upper groove 131 and the bent end 130a may protrude toward the upper cooling plate 200. The inner protrusion 130d may be located near the upper cooling plate 200. For example, the inner protrusion 130d located between the lower groove 132 and the bent end 130a may protrude toward the lower cooling plate 300. The inner protrusion 130d may be located near the lower cooling plate 300.

When the upper and lower cooling plates 200 and 300 are bonded to the adhesive, the inner protrusions 130d prevent the upper and lower cooling plates 200 and 300 from approaching the inner portion 130 by more than a certain distance. As such, when the main frame 100 and the upper and lower cooling plates 200 and 300 are coupled to each other, the upper and lower cooling plates 200 and 300 may not be detached. In addition, by providing the inner protrusions 130d on the main frame 100, a coupling force between the main frame 100 and the upper and lower cooling plates 200 and 300 may be increased.

Figure 11:
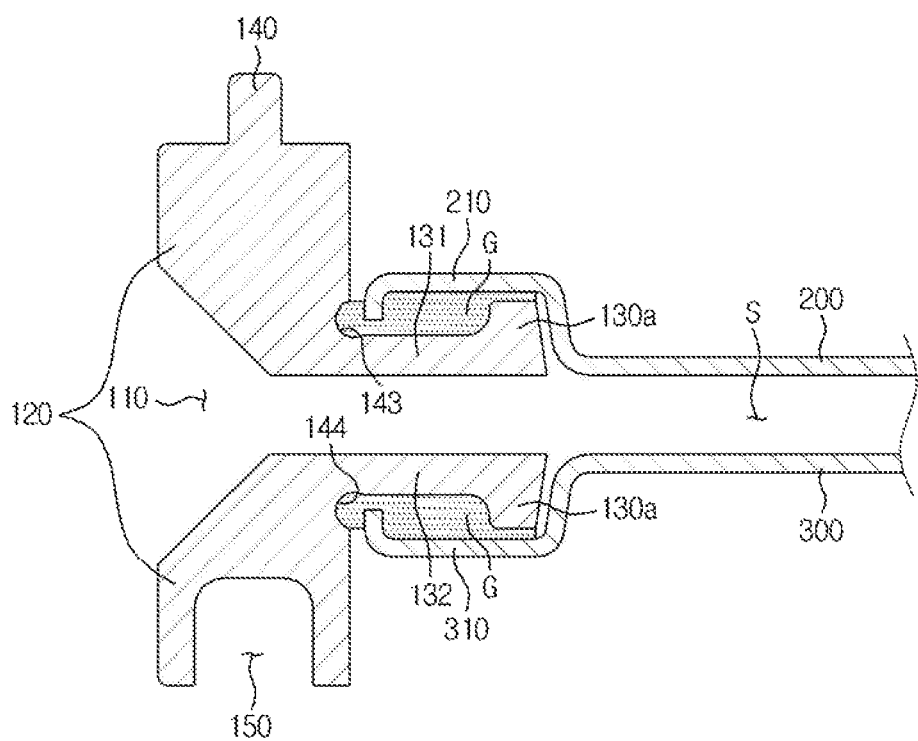

As illustrated in FIG. 11, according to another embodiment of the present disclosure, an upper outer gutter 143 and a lower outer gutter 144 may be provided in the outer portion 120 of the main frame 100.

The upper outer gutter 143 may be located near the upper groove 131. The upper outer gutter 143 may be located outside the upper cooling plate 200. The adhesive may be inserted into the upper outer gutter 143.

The lower outer gutter 144 may be located near the lower groove 132. The lower outer gutter 144 may be located outside the lower cooling plate 300. The adhesive may be inserted into the lower outer gutter 144.

Since the upper and lower outer gutters 143 and 144 are provided, a larger amount of the adhesive may be used to bond the upper and lower cooling plates 200 and 300 to the main frame 100, and thus a coupling force between the main frame 100 and the upper and lower cooling plates 200 and 300 may be increased.

Figure 12:
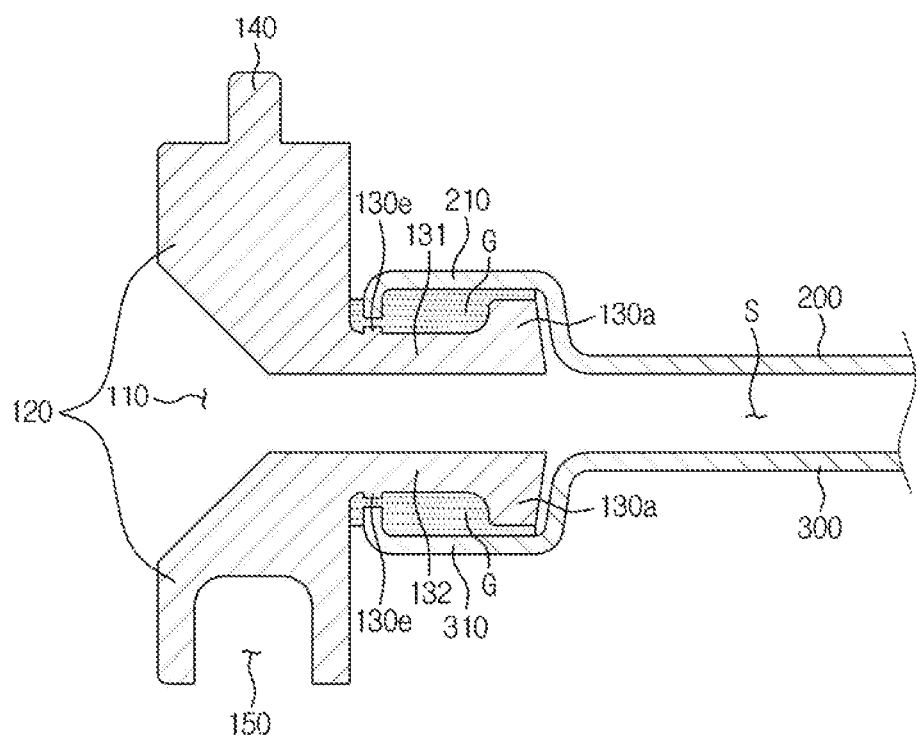

As illustrated in FIG. 12, according to another embodiment of the present disclosure, the main frame 100 may further include lower protrusions 130e. The lower protrusions 130e may be located on the upper and lower grooves 131 and 132.

For example, the lower protrusions 130e provided on the upper groove 131 may be provided on a surface of the upper groove 131 facing the end of the upper bonding portion 210. The lower protrusions 130e may protrude toward the upper bonding portion 210. A plurality of lower protrusions 130e may be provided along length directions of the unit frames 101 corresponding to the long sides of the main frame 100. The plurality of lower protrusions 130e may be spaced apart from each other by a certain distance along the length directions of the unit frames 101. Ends of the lower protrusions 130e may be spaced apart from the end of the upper bonding portion 210 by a certain distance.

For example, the lower protrusions 130e provided on the lower groove 132 may be provided on a surface of the lower groove 132 facing the end of the lower bonding portion 310. The lower protrusions 130e may protrude toward the lower bonding portion 310. A plurality of lower protrusions 130e may be provided along length directions of the unit frames 101 corresponding to the long sides of the main frame 100. The plurality of lower protrusions 130e may be spaced apart from each other by a certain distance along the length directions of the unit frames 101. Ends of the lower protrusions 130e may be spaced apart from the end of the lower bonding portion 310 by a certain distance.

By providing the lower protrusions 130e on the main frame 100, the upper or lower bonding portion 210 or 310 may form a certain distance from the upper or lower groove 131 or 132. As such, the upper and lower cooling plates 200 and 300 may be coupled to the main frame without being detached, and thus a coupling force with the main frame 100 may be increased.

In addition, a certain amount of the adhesive may flow out through spaces between the lower protrusions 130e and the upper and lower bonding portions 210 and 310 and thus bonding force may be increased.

Figure 13:
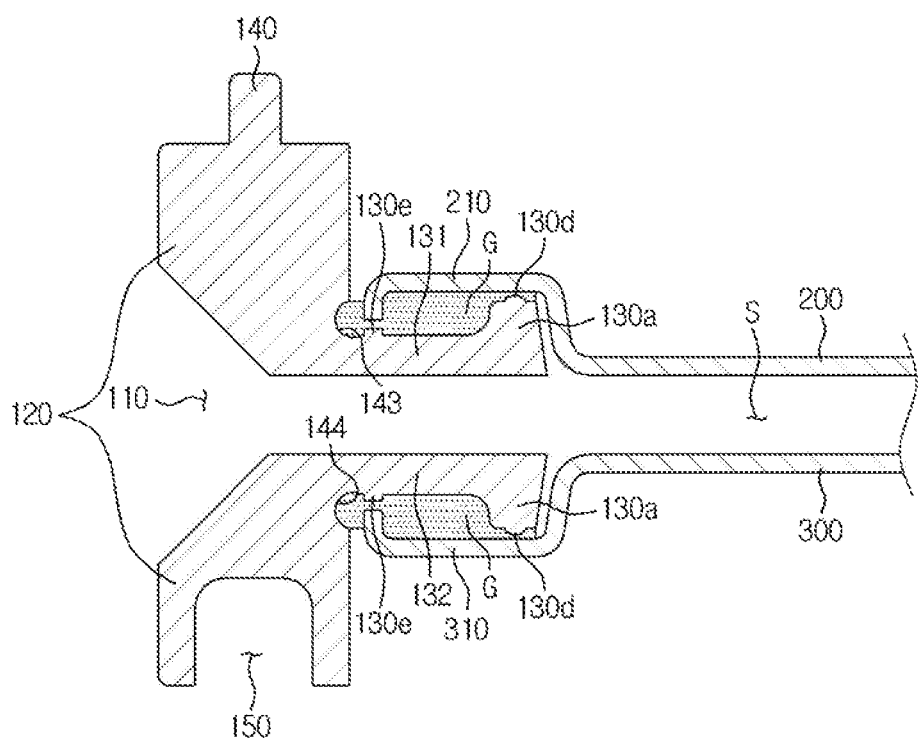

As illustrated in FIG. 13, according to another embodiment of the present disclosure, the main frame 100 may include all of the inner protrusions 130d, the upper and lower outer gutters 143 and 144, and the lower protrusions 130e.

Figure 14:
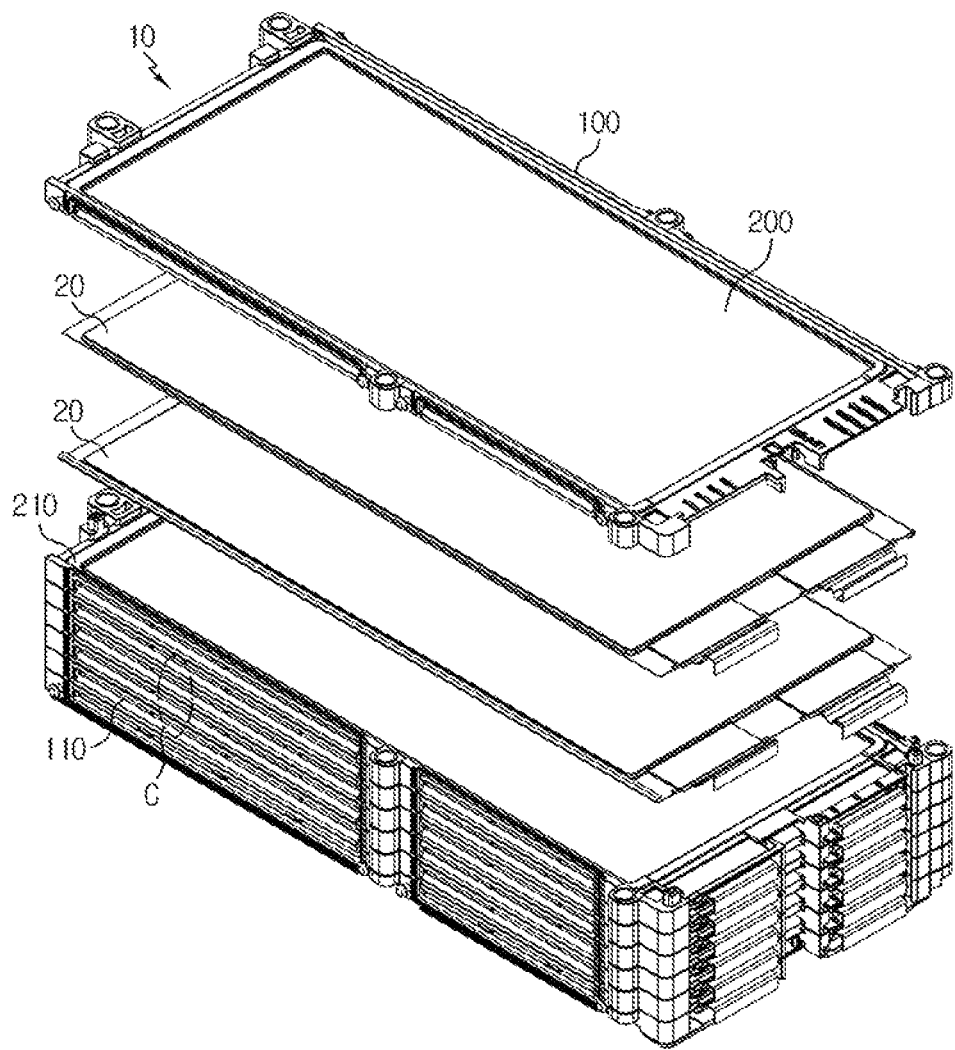
FIG. 14 is a perspective view of a plurality of cartridges and a plurality of secondary batteries stacked on one another, according to an embodiment of the present disclosure.
Figure 15:
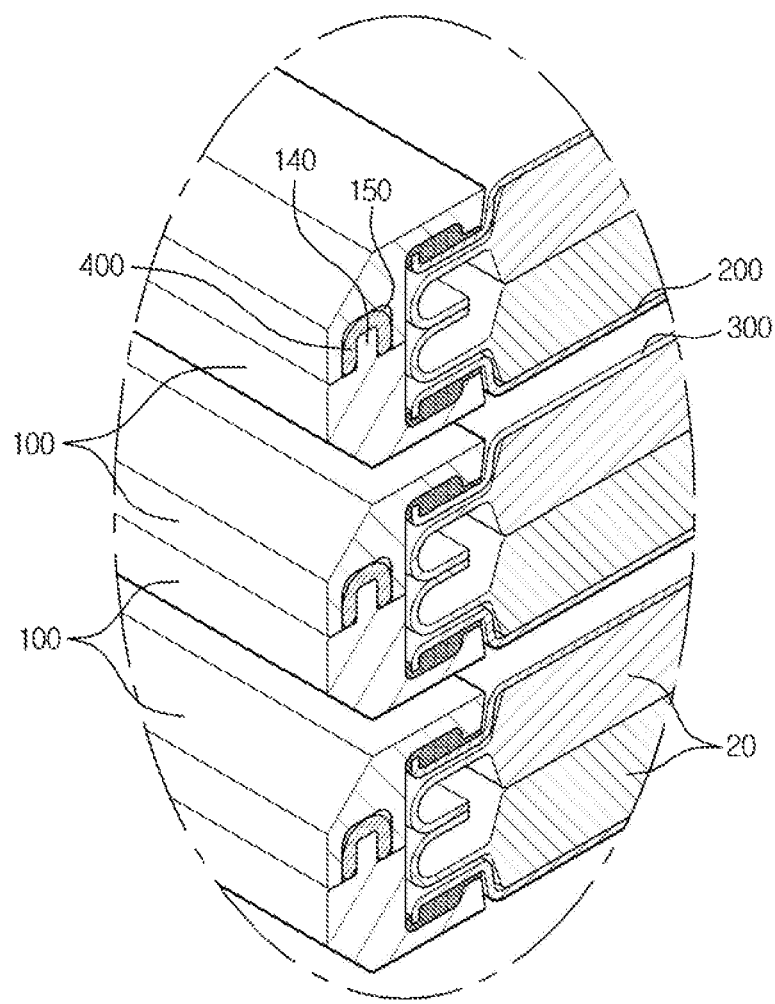
FIG. 15 is a cross-sectional view of portion C of FIG. 14.

FIG. 14 is a perspective view of a plurality of cartridges 10 and a plurality of secondary batteries stacked on one another, according to an embodiment of the present disclosure, and FIG. 15 is a cross-sectional view of portion C of FIG. 14.

Referring to FIGS. 14 and 15, the cartridges 10 for secondary batteries, according to the present disclosure, may be vertically stacked on one another. To this end, two or more main frames 100 may be vertically stacked on one another.

In this case, secondary batteries may be accommodated in an internal space defined by the main frames 100 in a horizontal direction. Accordingly, the main frames 100 may cover outer circumferences of the secondary batteries. That is, if the cartridges 10 are stacked one another while the secondary batteries are accommodated in the internal space, the outer circumferences of the secondary batteries may be covered by the main frames 100 and thus may not be exposed.

Using the cartridges 10 according to the present disclosure, one secondary battery may be accommodated on the upper cooling plate 200 and another secondary battery may be accommodated under the lower cooling plate 300. Accordingly, each of the cartridges 10 according to the present disclosure may accommodate two secondary batteries. In addition, two secondary batteries may be accommodated between the lower cooling plate 300 of an upper cartridge 10 and the upper cooling plate 200 of a lower cartridge 10.

Particularly, in the current embodiment, a sealing rib 140 protruding in a vertical direction may be provided on top surfaces of the pair of unit frames having the openings 110, and a trench 150 having a larger size than the sealing rib 140 may be provided in surfaces opposite to the surfaces on which the sealing rib 140 is provided.

The cartridge 10 may further include a sealing member 400 coupled to the sealing rib 140 and at least partially inserted into the trench 150 of a neighboring main frame 100 when the main frames 100 are vertically stacked on one another.

For example, as illustrated in FIG. 15, if the sealing member 400 is located on the main frame 100 and the trench 150 is provided under the main frame 100, when the cartridges 10 are stacked on one another, the main frames 100 may be stacked on one another and the sealing member 400 of a lower cartridge 10 may be inserted into the trench 150 of an upper cartridge 10. Particularly, a top surface of the sealing member 400 may contact a top surface of the trench 150 of the upper cartridge 10.

Due to the above-described configuration of the present disclosure, the sealing member 400 may further increase sealability of coupling parts between the cartridges 10. That is, the sealing member 400 may seal the coupling parts between the cartridges 10 to prevent the flow of a fluid through the coupling parts. For example, when a gas is generated by the secondary batteries, the sealing member 400 may prevent leakage of the gas through the coupling parts between the cartridges 10.

The sealing member 400 may be made of polyurethane foam. Polyurethane foam has an excellent sealability due to a high elasticity, may not be easily deformed or damaged due to a high strength, and has an excellent electric insulation property. However, the present disclosure is not limited to the above material of the sealing member 400, and the sealing member 400 may be made of various other materials. For example, the sealing member 400 may be made of silicon.

A battery module may be configured by vertically stacking two or more cartridges 10 on one another, and accommodating one or more secondary batteries in an internal space defined by the stacked cartridges 10.

Figure 16:
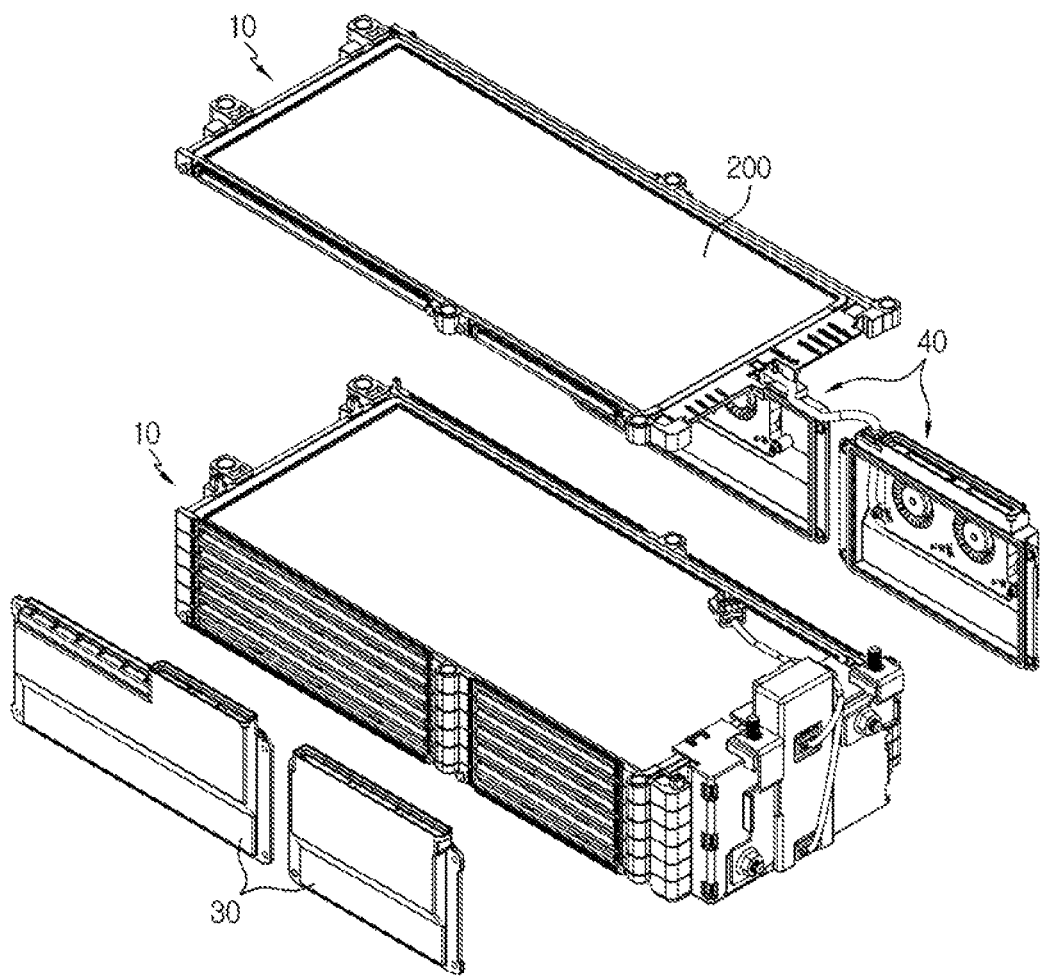
FIG. 16 is an exploded perspective view of a battery module according to an embodiment of the present disclosure.

FIG. 16 is an exploded perspective view of a battery module according to an embodiment of the present disclosure.

As illustrated in FIG. 16, the battery module according to the present disclosure may include secondary batteries, the cartridges 10 for the secondary batteries, an inlet duct 30, and an outlet duct 40. Herein, the inlet duct 30 may be provided near an open part of the cooling channels S provided in the cartridges 10 and may serve as a space and path through which a fluid flows into the cooling channels S. The outlet duct 40 may be provided near the other open part of the cooling channels S provided in the cartridges 10 and may serve as a space and path through which the fluid flowing in the cooling channels S are discharged outside the battery module. Particularly, in the cartridge 10 according to an embodiment of the present disclosure, the openings 110 may be provided in two side surfaces of the main frame 100 and the inlet duct 30 and the outlet duct 40 may be provided near the side surfaces having the openings 10. Each of the inlet duct 30 and the outlet duct 40 may include a fan to facilitate the flow of a cooling fluid into or out of the cooling channels S.

A battery pack according to the present disclosure may include at least one battery module according to the present disclosure. The battery module may include a plurality of the above-described cartridges for secondary batteries, according to the present disclosure. Therefore, the battery pack according to the present disclosure may include the cartridges according to the present disclosure. In addition to the battery module, the battery pack according to the present disclosure may further include a case for accommodating the battery module, and various devices for controlling charge/discharge of the battery module, e.g., a battery management system (BMS), a current sensor, and a fuse.

The cartridges according to the present disclosure may be applied to a vehicle such as an electric vehicle or a hybrid electric vehicle. That is, the vehicle according to the present disclosure may include the battery module according to the present disclosure, and the battery module may include secondary batteries and the cartridges according to the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In this specification, terms indicating directions, e.g., "top", "bottom". "left", "right", "front", and "rear", are used merely for convenience of explanation and it will be understood by one of ordinary skill in the art that the directions are variable depending on the location of a target object or an observer.

What is claimed is:

1. A cartridge for secondary batteries, the cartridge comprising:
    a main frame comprising at least four unit frames connected to each other at ends thereof to provide a cavity inside the four unit frames, the at least four unit frames including a first unit frame and a second unit frame spaced from the first unit frame in a horizontal direction, and two or more main frames are configured to be vertically stackable on one another;
    an upper cooling plate having a plate shape, comprising an upper bonding portion serving as edges and bonded to the main frame, and arranged to cover the cavity;
    a lower cooling plate having a plate shape, comprising a lower bonding portion serving as edges and bonded to the main frame, and spaced apart from the upper cooling plate by a predetermined distance to face the upper cooling plate and generating a cooling channel between the upper and lower cooling plates, the cooling channel extending an entire width of the main frame between the first unit frame and second unit frame; and
    openings formed in the unit frames, the openings formed between a top surface and a bottom surface of the unit frames,
    wherein the openings communicate with the cooling channel between the upper cooling plate and the lower cooling plate.

2. The cartridge of claim 1, wherein the main frame comprises four unit frames to configure a rectangular structure,
    wherein the openings are provided in a pair of unit frames corresponding to long sides of the main frame, and
    wherein the main frame further comprises a plate supporting member having an end fixed to the opening of any one of the pair of unit frames and another end fixed to the opening of the other of the pair of unit frames, and configured to cross the cavity of the main frame in the horizontal direction.

3. A battery module comprising the cartridge of claim 1.

4. A battery pack comprising the battery module of claim 3.

5. A vehicle comprising the battery pack of claim 4.

6. The cartridge of claim 1, wherein the openings are formed in opposed unit frames, and
    at least one supporting member having a first end fixed in the opening of one of the opposed unit frames and a second end fixed in the opening of the other of the opposed unit frames, and crossing the cavity of the main frame.

7. A cartridge for secondary batteries, the cartridge comprising:
    a main frame comprising at least four unit frames connected to each other at ends thereof to provide a cavity inside the four unit frames, wherein at least some of the unit frames have openings penetrating therethrough in a horizontal direction and two or more main frames are configured to be vertically stackable on one another;
    an upper cooling plate having a plate shape, comprising an upper bonding portion serving as edges and bonded to the main frame, and arranged to cover the cavity; and
    a lower cooling plate having a plate shape, comprising a lower bonding portion serving as edges and bonded to the main frame, and spaced apart from the upper cooling plate by a predetermined distance to face the upper cooling plate and generating a cooling channel between the upper and lower cooling plates,
    wherein the main frame comprises:
    an upper groove provided along a circumferential direction, having a concave shape, and filled with an adhesive; and
    a lower groove provided below the upper groove, having a shape symmetrical to the upper groove, and filled with the adhesive, and
    wherein the upper bonding portion is bonded and fixed to the upper groove and the lower bonding portion is bonded and fixed to the lower groove.

8. The cartridge of claim 7, wherein an end of the upper bonding portion is bent downward and is inserted into the upper groove, and
    wherein an end of the lower bonding portion is bent upward and is inserted into the lower groove.

9. The cartridge of claim 7, wherein the main frame comprises:
    an outer portion serving as outer edges of the main frame; and
    an inner portion extending from between top and bottom surfaces of the outer portion in the horizontal direction to provide the upper and lower grooves, and comprising an end bent upward and downward.

10. The cartridge of claim 9, wherein the upper bonding portion has a convex shape in an upward direction and covers the inner portion from above to surround the adhesive, and wherein the lower bonding portion has a convex shape in a downward direction and covers the inner portion from below to surround the adhesive.

11. The cartridge of claim 10, wherein inner circumferential surfaces of the upper and lower bonding portions surround the adhesive and are embossed.

12. The cartridge of claim 10, wherein an end of the upper bonding portion faces downward and an end of the lower bonding portion faces upward, and
   wherein the inner portion comprises end seat gutters into which the ends of the upper and lower bonding portions are tightly fittable.

13. The cartridge of claim 12, wherein the upper bonding portion comprises an upper reinforcing rib protruding downward from a location spaced apart from the end of the upper bonding portion by a predetermined distance,
   wherein the lower bonding portion comprises a lower reinforcing rib protruding upward from a location spaced apart from the end of the lower bonding portion by a predetermined distance, and
   wherein the inner portion further comprises reinforcing rib seat gutters into which the upper and lower reinforcing ribs are tightly fittable.

14. The cartridge of claim 9, wherein the main frame further comprises an inner protrusion located on the inner portion between the upper groove and the bent end or between the lower groove and the bent end, and protruding upward and downward.

15. The cartridge of claim 9, wherein the main frame further comprises:
   an upper outer gutter provided in the outer portion near the upper groove and located outside the upper cooling plate; and
   a lower outer gutter provided in the outer portion near the lower groove and located outside the lower cooling plate, and
   wherein the adhesive is inserted into the upper and lower outer gutters.

16. A cartridge for secondary batteries, the cartridge comprising:
   a main frame comprising at least four unit frames connected to each other at ends thereof to provide a cavity inside the four unit frames, wherein at least some of the unit frames have openings penetrating therethrough in a horizontal direction and two or more main frames are configured to be vertically stackable on one another;
   an upper cooling plate having a plate shape, comprising an upper bonding portion serving as edges and bonded to the main frame, and arranged to cover the cavity; and
   a lower cooling plate having a plate shape, comprising a lower bonding portion serving as edges and bonded to the main frame, and spaced apart from the upper cooling plate by a predetermined distance to face the upper cooling plate and generating a cooling channel between the upper and lower cooling plates,
   wherein the main frame comprises:
   a sealing rib protruding from a top or bottom surface of at least one unit frame in a vertical direction; and
   a trench having a larger size than the sealing rib and provided in a surface opposite to the surface on which the sealing rib is provided, and
   wherein the main frame further comprises a sealing member coupled to the sealing rib and at least partially inserted into the trench of a neighboring main frame when the main frames are vertically stacked on one another.

* * * * *